United States Patent Office 3,294,846
Patented Dec. 27, 1966

3,294,846
PROCESS FOR PREPARING META-ARYLOXY PHENOLS
John E. Livak, Midland, Mich., and Edgar C. Britton, deceased, late of Midland, Mich., by J. W. Britton, executor, Midland, Mich., assignors to The Dow Chemical Company, Midland, Mich., a corporation of Delaware
No Drawing. Filed Oct. 10, 1962, Ser. No. 229,757
7 Claims. (Cl. 260—613)

The present invention relates to a novel process for preparing meta-aryloxyphenols. More particularly the present invention concerns a novel one-step process for preparing meta-aryloxyphenols. The term meta-aryloxyphenols as used herein is used in the sense to include those aryloxyphenols having the generic formula:

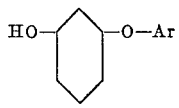

wherein Ar represents a radical selected from the group consisting of an aromatic radical of the benzene series, naphthalene series, phenoxy or polyphenoxy aromatic radical of the benzene series, and biphenyl.

The present invention provides a process whereby m-aryloxyphenols can be prepared by reaction of the potassium salt of resorcinol with an aryl bromide in the presence of a copper catalyst and a suitable solvent at a temperature of from about 125° C. to 185° C. at about atmospheric pressure.

The unexpected feature of the present invention is that an alkali metal salt of resorcinol and an aryl bromide will react to form the mono-ether of the resorcinol. A further unexpected feature of the present invention was the finding that the reaction would proceed satisfactorily with good yields at about atmospheric pressure. The process proceeds readily when the potassium salt of the resorcinol is made in situ and the resorcinol is employed in a slight molar excess over the potassium donor.

The preferred method for carrying out the present invention is to react resorcinol with potassium hydroxide, and remove the water of reaction by vacuum distillation after the exothermic reaction subsides. When the theoretical amount of water has been removed a suspension of copper catalyst in the aryl bromide is slowly introduced with stirring. In order to facilitate the reaction a solvent is preferably employed, and when the solvent is a dialkyl amide it is preferably added after the potassium resorcinolate has been formed and catalyst has been added. Further it is to be understood that if sufficient excess resorcinol has been employed, no amide solvent need be employed. It is preferable although not essential that the reactions be carried out under an atmosphere free of oxidizing gases. Thus, conveniently the reaction is carried out under a nitrogen atmosphere equal to about atmospheric pressure.

The aryl bromides which can be reacted with potassium resorcinolate include the aryl bromides of the benzene series, and the naphthalene series, as well as the diphenyl bromides, the phenyl ethers and polyphenyl ethers which are substituted on at least one aromatic ring with a bromine atom. Representative of the compounds which fall within the above classes are: bromobenzene, o-bromochlorobenzene, m-bromochlorobenzene, p-bromochlorobenzene, o-dibromobenzene, p-dibromobenzene, m-dibromobenzene, o-bromotoluene, p-bromotoluene, m-bromotoluene, bromo-o-xylene, bromo-p-xylene, bromo-m-xylene, o-bromoethylbenzene, p-bromoethylbenzene, m-bromoethyl benzene, bromophenoxybenzene, the bromo-phenoxy-chlorobenzenes, bromodiphenyls, 1-bromonaphthalene, 2-bromonaphthalene and the like.

The dialkyl amides which can be employed as solvents for the reaction are the di-lower alkyl amides of organic acids having the generic formula:

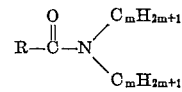

wherein R represents a member selected from the group consisting of hydrogen, alkyl, dialkylamino alkyl, phenyl and alkylphenyl, said alkyl moiety having from 1 to 4 carbon atoms, and $m$ represents an integer from 1 to about 4. Representative of the amides which can be employed are dimethylformamide, dimethylacetamide, dimethylpropioamide, diethylformamide, dimethylacetamide, dipropylformamide, dipropylacetamide, diethylbenzamide, diethyltoluamide and the like to name only a few.

While the use of a solvent is preferred it is to be understood that the resorcinol itself can be used in excess and thus in effect is the solvent.

The temperature of the reaction between the potassium resorcinolate and the aryl bromide can vary from about 125° to about 185° C. Below 125° C. the reaction proceeds slowly and an inordinate reaction period is required to obtain commercially useful yields and conversions. Above about 185° C. the reaction proceeds rapidly but decomposition of the potassium resorcinolate becomes pronounced. The preferred temperature range is from about 145° to about 155° C.

The reaction time generally varies inversely with the temperature, the lower temperatures requiring longer periods of time to achieve reasonably good yields than do the higher temperatures. At the preferred temperature range the reaction time varies from about 3 to 4 hours. Reaction times less than those set forth generally result in decreased conversions and reaction times greater than those set forth generally result in some decomposition of the resorcinolate.

The reaction is preferably carried out under a non-oxidizing atmosphere such as nitrogen, argon, helium or the like. The pressure of such atmosphere over the reaction mixture is preferably about atmospheric pressure. It is understood that pressures greater than or less than atmospheric pressure can be employed but no commercial advantage is obtained.

The ratio of reactants can vary considerably but is preferably from a stoichiometric amount to an excess (up to about 100%) of resorcinol to potassium to form the mono-potassium salt, and from stoichiometric to an excess of mono-potassium salt to the aryl bromide.

The following examples illustrate the present invention but are not to be construed as limiting:

EXAMPLE 1

General procedure

A 500 ml. 3 necked, round-bottomed flask with a thermometer well was fitted with a mechanical stirrer, an 18-inch Vigreux column, a thermometer, a dropping funnel and an adapter for maintaining a nitrogen atmosphere in the flask. The Vigreux column was connected to a water-cooled condenser which in turn was connected to a Dry Ice trap and a vacuum pump. The flask was charged with resorcinol and KOH (85%; as pellets) and a slow stream of nitrogen passed into the flask. After the initiial exothermic reaction had subsided the water of reaction and water introduced with the KOH was removed under a pressure of 25 mm. Hg and a final pot temperature of 155° C. The reaction mixture was allowed to cool to about 140° C., the pressure was raised to 1 atm. and a suspension of 1 gram of copper oxide in the aryl bromide was added dropwise through the dropping funnel. Stirring was commenced during the addition and continued throughout the remainder of the reaction. When a solvent was employed it was added either prior to the addition of the suspension, with the suspension or after introduction of the suspension. Heating at about 145–185° C. and stirring were generally continued for about 3 to 4 hours after addition of the suspension. Upon completion of the reaction the reaction mixture was cooled to about 100° C., poured into water with stirring, acidified to about pH 2 with 5 N $H_2SO_4$ and the dark colored oil which formed extracted with ethylene dichloride. The extract was washed with water and the aqueous mixture remaining after extraction combined with the wash and analyzed for KBr. The extract was filtered through $Na_2SO_4$ (anhydrous) and distilled through an 18″ Vigreux column under reduced pressure. Any unreacted resorcinol was recovered by extraction from the water phase with ether. The following table sets forth the various reactants, reaction conditions and results obtained under the stated conditions:

o-dibromobenzene,
p-dibromobenzene,
m-dibromobenzene,
o-bromotoluene,
p-bromotoluene,
m-bromotoluene,
bromo-o-xylene,
bromo-p-xylene,
bromo-m-xylene,
o-bromoethylbenzene,
p-bromoethylbenzene,
m-bromoethylbenzene,
bromophenoxybenzene,
bromophenoxychlorobenzene,
bromodiphenyl,
1-bromonaphthalene and
2-bromonaphthalene, in the presence of a catalytic amount of copper at a temperature of from about 125° to 185° C., and in the presence of a reaction solvent selected from the group consisting of resorcinol and a dialkyl amide.

2. In the process of claim 1 wherein the reaction is

| Ex. | Moles | | | Resorcinol: KOH:R Br | Solvent | | Catalyst | | Reaction Conditions | | R Br Conv., percent | m-phenoxyphenol | |
|---|---|---|---|---|---|---|---|---|---|---|---|---|---|
| | Resorcinol | KOH | R Br [1] | | Kind | Amt. in Ml. | Grams | Percent | Time, Hours | Temp., °C. | | Grams | Yield, percent [3] |
| 1 | 1.5 | 1.2 | 0.80 | 1.25:1.0:0.67 | HCON(CH$_3$)$_2$ | 100 | 1.0 | 0.3 | 3 | 145–150 | 89.5 | 113 | 85.3 |
| 2 | 1.5 | 1.0 | 0.80 | 1.5:1.0:0.80 | HCON(CH$_3$)$_2$ | 100 | 1.0 | 0.3 | 4 | 145–150 | 81.3 | 89 | 75 |
| 3 | 1.5 | 1.2 | 0.80 | 1.25:1.0:0.67 | CH$_3$CON(CH$_3$)$_2$ | 100 | 1.0 | 0.3 | 5 | 145–150 | 77.6 | 101 | 87.7 |
| 4 | 1.5 | 1.2 | 0.80 | 1.25:1.0:0.67 | (CH$_3$)$_2$N-CH$_2$CON(CH$_3$)$_2$ | 90 | 1.0 | 0.3 | 5 | 145–150 | 78.8 | 80 | 68.3 |
| 5 | 3.0 | 2.0 | 1.0 | 1.5:1.0:0.5 | Resorcinol | 220 g. | 5 | 0.9 | 5.5 | 160–185 | 73 | 97.5 | 52.4 |
| 6 | 3.0 | 2.0 | 1.0 | 1.5:1.0:0.5 | do | 110 g. | 5 | 0.85 | 5 | 160–178 | 81.0 | 101 | 54.3 |
| 7 | 1.0 | 1.0 | [2] 0.8 | 1.0:1.0:0.8 | HCON(CH$_3$)$_2$ | 150 | 1.0 | | 5 | 145–155 | 52.5 | 74 | 63.3 |

[1] R Br is bromobenzene except as indicated in last example by [2].
[2] m-bromophenoxy benzene (65% meta-bromo and 30% para-bromo isomer).
[3] Percent yield based on bromide conversions.

It is thus evident that one can prepare according to the present method the following compounds:

3-phenoxyphenol,
3-(2-chlorophenoxy)phenol,
3-(3-chlorophenoxy)phenol,
3-(4-chlorophenoxy)phenol,
3-(2-bromophenoxy)phenol,
3-(3-bromophenoxy)phenol,
3-(4-bromophenoxy)phenol,
3-(2-toloxy)phenol,
3-(4-toloxy)phenol,
3-(3-toloxy)phenol,
3-(2,3-dimethylphenoxy)phenol,
3-(2,4-dimethylphenoxy)phenol,
3-(2,5-dimethylphenoxy)phenol,
3-(3,5-dimethylphenoxy)phenol,
3-(2-ethylphenoxy)phenol,
3-(3-phenoxy)phenoxyphenol,
3-(3-chlorophenoxy)phenoxy phenol,
3-(2-biphenyloxy)phenol,
3-(2-naphthyloxy)phenol; and the like.

We claim:
1. A method for preparing m-phenoxyphenols which comprises reacting the potassium salt of resorcinol with a bromide selected from the group consisting of aryl bromobenzene,
o-bromochlorobenzene,
m-bromochlorobenzene,
p-bromochlorobenzene, carried out in the presence of a dialkylamide solvent.

3. A method for preparing m-phenoxyphenol which comprises reacting the potassium salt of resorcinol with bromobenzene in the presence of a catalytic amount of copper at a temperature of from about 125° to 185° C. in the presence of a dialkylamide solvent.

4. A method for preparing 3-(2-toloxy)phenol which comprises reacting the potassium salt of resorcinol with 2-bromotoluene in the presence of a catalytic amount of copper at a temperature of from about 125° to 185° C. in the presence of a dialkylamide solvent.

5. A method for preparing 3-(3-phenoxy)phenoxyphenol which comprises reacting the potassium salt of resorcinol with 3-phenoxybromobenzene in the presence of a catalytic amount of copper at a temperature of from about 125° to 185° C. in the presence of a dialkylamide solvent.

6. A method for preparing m-phenoxyphenols which comprises reacting the mono-potassium salt of resorcinol at from 125° to 185° C. in the presence of a copper catalyst and a dialkylamide solvent with an aryl bromide selected from the group consisting of phenyl bromide, methylphenyl bromide, ethylphenyl bromide, dimethylphenyl bromide, phenoxyphenyl bromide, chlorophenoxyphenyl bromide, bromodiphenyl, and bromonaphthalene.

7. A method for preparing m-phenoxyphenols which comprises reacting the potassium salt of resorcinol at from 125° to 185° C. in the presence of a copper catalyst and a dialkylamide solvent with an aryl bromide selected from the group consisting of bromobenzene, bromochlorobenzene, dibromobenzene, bromotoluene, bromoxylene, bromoethylbenzene, bromophenoxybenzene, bromophenoxychlorobenzene, bromodiphenyl and bromonaphthalene.

References Cited by the Examiner

UNITED STATES PATENTS

| 1,888,827 | 11/1932 | Klarmann et al. | 260—613 |
| 3,032,594 | 5/1962 | Towle | 260—612 |

OTHER REFERENCES

Ullmann et al.: Annalen, vol. 350 (1906) (pp. 83–107), pp. 84, 95–102 relied on.

Ullmann et al.: Chemical Abstract, vol. 1 (1907), pp. 436–437.

LEON ZITZER, *Primary Examiner.*

B. HEFLIN, *Assistant Examiner.*